United States Patent
Kuzuyama et al.

(10) Patent No.: US 7,284,423 B2
(45) Date of Patent: Oct. 23, 2007

(54) FLOW-VELOCITY MEASURING DEVICE

(75) Inventors: Daisuke Kuzuyama, Kusatsu (JP); Toshimitsu Fujiwara, Kusatsu (JP)

(73) Assignee: Omron Corporation, Kyoto (JP)

( * ) Notice: Subject to any disclaimer, the term of this patent is extended or adjusted under 35 U.S.C. 154(b) by 164 days.

(21) Appl. No.: 11/291,699

(22) Filed: Nov. 30, 2005

(65) Prior Publication Data

US 2006/0137444 A1    Jun. 29, 2006

(30) Foreign Application Priority Data

Nov. 30, 2004   (JP)   ............... 2004-346724

(51) Int. Cl.
*G01F 5/00* (2006.01)

(52) U.S. Cl. .................................. 73/202

(58) Field of Classification Search ............ 73/202, 73/202.5, 863.61, 204.21, 204.25
See application file for complete search history.

(56) References Cited

U.S. PATENT DOCUMENTS

| | | | |
|---|---|---|---|
| 4,215,565 A | * | 8/1980 | Zanker ................ 73/30.01 |
| 4,457,169 A | * | 7/1984 | Lauterbach et al. ....... 73/202.5 |
| 4,914,947 A | | 4/1990 | Davidson |

FOREIGN PATENT DOCUMENTS

| | | |
|---|---|---|
| EP | 0 369 592 A2 | 5/1990 |
| EP | 1 091 195 A1 | 4/2001 |
| EP | 1 568 999 A2 | 8/2005 |
| JP | 3124457 | 5/1991 |

OTHER PUBLICATIONS

European Search Report dated Jul. 13, 2006 (6 pages).

* cited by examiner

*Primary Examiner*—Jewel Thompson
(74) *Attorney, Agent, or Firm*—Osha Liang LLP

(57) ABSTRACT

A flow-velocity measuring device of a simple structure in which the size in the direction of flow of a measured fluid is small and the size of a surface area for blocking the flow of the measured fluid is small includes: an inlet port formed on a surface of a main body and opening toward the upstream of a measured fluid; an introducing channel extending in the main body from the inlet port; a branch channel branched from the introducing channel and connected at a terminal end thereof to a first discharge port opening on the surface of the main body; a discharge channel extending from the introducing channel and connected at a terminal end thereof to a second discharge port opening on the surface of the main body; and a sensor element provided in the branch channel or in a measuring channel further branched from the branch channel and connected at a terminal end thereof to a third discharge port opening on the surface of the main body, and at least any one of the discharge channel, the introducing channel, the branch channel, and the measuring channel comprises a part overlapped with other flow channels in the direction at a right angle with respect to the direction of flow of the introducing channel and the direction of flow of the branch channel at a branch point from the introducing channel to the branch channel.

19 Claims, 8 Drawing Sheets

FLOW-VELOCITY MEASURING DEVICE

BACKGROUND OF THE INVENTION

1. Field of the Invention

The present invention relates to a flow-velocity measuring device for detecting the velocity of a fluid.

2. Description of the Related Art

In electronic equipment such as personal computers in which air cooling is performed by a cooling fan, lowering of the quantity of an airflow due to clogging of a filter causes lowering of a cooling capability and hence may cause failure of function thereof. Therefore, such equipment is adapted in such a manner that the quantity of the airflow is constantly observed by the flow-velocity measuring device, and when the quantity of the airflow is lowered, the number of revolutions of the fan is increased, or an alarm is given to a user. In the related art, the flow-velocity measuring device used for such an application has a structure in which a sensor element is arranged in a flow channel to measure the flow velocity of air. However, when the flow-velocity measuring device in the related art is used for a long time, there arises a problem such that dust or grim in the air is attached to and accumulated on the sensor element, and hence the accuracy may be lowered.

In order to solve the above-described problem, Patent Document 1 (Japanese Patent No. 3124457) discloses a flow-velocity measuring device in which a trap wall is provided in a flow channel, so that the airflow is introduced to a sensor element after having caught dust in the airflow by a trap wall utilizing inertia of the dust. However, there is a disadvantage such that the dust may be accumulated in the device, and in due course, clogs the flow channel, or a risk such that when the equipment provided with the flow-velocity measuring device is carried, the dust accumulated in the device may attach to the sensor element. There is also a problem such that the length between an inlet port and a discharge port is long, and hence it cannot be installed in a short flow channel.

In Patent Document 2 (U.S. Pat. No. 4,914,947), there is disclosed a flow-velocity measuring device in which an arcuate flow channel and a branch channel branched from the arcuate flow channel inwardly of the arc are defined by providing a groove in a main body, so that dust contained in a fluid is gathered to the outside of the arc of the arcuate flow channel by a centrifugal force (inertia force), and the fluid containing less dust inside the arc is introduced to the branch channel, thereby obtaining flow of the fluid with less dust containing therein, and the velocity of the fluid is detected by a sensor element. The flow-velocity measuring device in Patent Document 2 is adapted to separate the dust utilizing a gravitational force when the flow velocity is low by providing steps so that the depth of the branch channel is smaller than that of the arcuate channel. However, according to the flow-velocity measuring device in Patent Document 2, since the flow channel is defined by closing an upper opening of the groove on the main body by a circuit board having the sensor element, it is not possible to provide a step between the arcuate channel and the branch channel on the side of the circuit board. Therefore, when the device is installed upside down, there arises a problem such that the dust cannot be separated sufficiently when the flow velocity is low. In addition, since the measuring accuracy may be deteriorated if leakage exists between the circuit board and the main body, it is necessary to place the packing between the circuit board and the main body in order to realize the flow-velocity measuring device of high accuracy, which may result in a complicated structure. Furthermore, the flow-velocity measuring device in Patent Document 2 is disadvantageously long in the direction of flow of the measured fluid as in the case of the flow-velocity measuring device in Patent Document 1.

The flow-velocity measuring device is desired to be short in size in the direction of flow of the measured fluid and small in surface area which extends at a right angle with respect to the direction of flow for blocking the flow in order to downsize equipment in which the flow-velocity measuring device is integrated. Therefore, in the case of the flow-velocity measuring devices in Patent Documents 1 and 2, since the inlet port is located apart from the discharge port, even though the size in the direction of flow can be reduced, the surface area for blocking the flow increases disadvantageously simply by opening the inlet port and the discharge port laterally.

SUMMARY OF THE INVENTION

In view of the problems described above, it is an object of the invention to provide a flow-velocity measuring device in a simple structure, which is small in size in the direction of flow of a measured fluid and small in surface area for blocking the flow of the measured fluid.

In order to solve the above-described problem, a flow-velocity measuring device according to the invention includes an inlet port formed on a surface of a main body and opening toward the upstream of the measured fluid, an introducing channel extending in the main body from the inlet port, a branch channel branched from the introducing channel and connected at a terminal end thereof to a first discharge port opening on the surface of the main body, a discharge channel extending from the introducing channel and connected at a terminal end thereof to a second discharge port opening on the surface of the main body, and a sensor element provided in the branch channel or in a measuring channel further branched from the branch channel and connected at a terminal end thereof to a third discharge port opening on the surface of the main body; wherein at least any one of the discharge channel, the introducing channel, the branch channel, and the measuring channel includes a part overlapped with other flow channels in the direction at a right angle with respect to the direction of flow of the introducing channel and the direction of flow of the branch channel at a branch point from the introducing channel to the branch channel.

In this arrangement, since a branch in the lateral direction from the linear flow channel or a branch from the arcuate flow channel inwardly of the arc is provided, the velocity of the fluid from which dust is separated utilizing an inertia force generated by the mass of the dust contained in the fluid is measured by the sensor element, and hence deterioration of accuracy caused by the dust attached to the sensor element is prevented. In addition, since any one of the discharge channel, the introducing channel, the branch channel, and the measuring channel is overlapped with the branch of the flow channel at a right angle, the structure of the flow channel assumes a three-dimensional structure, and hence the size of the flow-velocity measuring device can be reduced.

In the flow-velocity measuring device of the invention, the direction of the branch channel at a branch point from the introducing channel to the branch channel may be at a right angle to the direction opposing the inlet port.

In this arrangement, since branch of the flow channel is provided in a plane perpendicular to the flow of the measured fluid, the size of the device in the direction of flow of the measured fluid may be reduced.

The flow-velocity measuring device of the invention may be configured in such a manner that the main body includes two half members to be joined to each other along the joint surfaces, and the flow channel having the overlapped portion may be a lateral hole which is in communication with the groove provided on the joint surface of the half member and extends from the opening on the side surface of the half member in parallel with the joint surface of the half member, and is not opened at least partly on the joint surfaces and in communication with the grooves in the inner portion.

In this arrangement, it is possible to mold the half member having the groove and the lateral hole by a known injection molding method using a three-part metal mold, and hence the flow channel which overlaps with the direction of flow of the measured fluid can be formed without increasing the number of components.

In the flow-velocity measuring device of the invention, the flow channels other than the flow channel having the overlapped portion may be defined by the grooves formed on the joint surfaces of the half members.

In this arrangement, a flow channel structure including the flow channels defined two-dimensionally by the grooves provided on the joint surfaces combined with the flow channel formed by the lateral hole overlapped therewith may easily be realized.

In the flow-velocity measuring device of the invention, the lateral hole may be opened also on the surface opposite from the joint surface at the opening on the side surface of the half member, and the opening on the side surface is sealed by a wall portion provided on the other half member.

In this arrangement, the fluid introduced or discharged into/from the flow-velocity measuring device flows in or out along the direction of flow of the measured fluid, and hence the flow of the fluid in the flow-velocity measuring device is not disturbed by substances around the flow-velocity measuring device, whereby accurate measurement of the flow velocity is achieved.

The flow-velocity measuring device of the invention may be configured in such a manner that a storage section is defined by grooves further provided on the joint surfaces of the half members so as to be adjacent to the branch channel or the measuring channel and have a sensor opening that opens to the branch channel or the measuring channel, and the sensor element is provided on the substrate stored in the storage section with the end surfaces thereof faced to the joining direction of the half members so as to be exposed from the sensor opening toward the inside of the branch channel or the measuring channel.

In this arrangement, the substrate is exposed to the flow channel only at small portions around the sensor element, and hence it is not necessary to seal the joint surfaces of the half members across the wide range. In addition, the portion around the sensor element can be brought into a tight contact with the outer wall of the sensor opening irrespective of the joining force of the half members owing to the shape of the groove provided on the half members for storing the substrate. Therefore, leakage from the flow channel can hardly occur between the substrate and the half members, and hence a part for sealing, such as a packing, is not necessary.

In the flow-velocity measuring device of the invention, the groove provided on the joint surfaces of the half members may be grooves whose depths from the both joint surfaces of the two half members change discontinuously.

In this arrangement, steps or baffle boards can be provided on the upper and lower sides of the flow channel. Therefore, even when the flow-velocity measuring device is installed upside down, the dust can be separated by the gravitational force, and hence accuracy of the sensor element is prevented from being deteriorated due to the attachment of the dust.

In the flow-velocity measuring device of the invention, the flow channel having the overlapped portion may be the discharge channel.

In this arrangement, when the steps are provided at each branch of the flow channel to narrow the flow channel in the direction of flow of the measured fluid to achieve separation of the dust by the gravitational force, by connecting the discharge channel which is shifted in the direction of flow of the measured fluid to a terminal end of the introducing channel, which is consequently the widest in the direction of flow of the measured fluid, displacement of the measured fluid in the direction of flow for being overlapped with other flow channels can easily be achieved. Therefore, a measured fluid being small in size in the flowing direction of the measured fluid, and small in surface area which blocks the flow of the measured fluid can easily be obtained.

In the flow-velocity measuring device of the invention, the overlapped portion of the discharge channel may be overlapped with the branch channel or the measuring channel where the sensor is provided.

In this arrangement, when the steps are provided at each branch of the flow channel to narrow the flow channel in the direction of flow of the measured fluid for separating the dust by the gravitational force, since the flow channel provided with the sensor which is consequently the narrowest in the direction of flow of the measured fluid and the discharge channel shifted in the direction of flow of the measured fluid are overlapped, the displacement of the measured fluid in the direction of flow can be realized further easily, and hence the size of the measured fluid in the direction of flow can easily be reduced.

In the flow-velocity measuring device of the invention, the sensor element may be provided in the measuring channel.

In this arrangement, since the dust is separated by more than two branches, the risk of attachment of the dust to the sensor element can further be reduced.

In the flow-velocity measuring device of the invention, the inlet port, the first discharge port, the second discharge port, and the third discharge port can all be opened near one end portion of the main body.

In this arrangement, the flow velocity can be measured only by exposing only one end of the flow-velocity measuring device into the flow of the measured fluid. Accordingly, the flow-velocity measuring device does not impair the flow of the measured fluid.

In the flow-velocity measuring device of the invention, the first discharge port, the second discharge port, and the third discharge port may be formed of one discharge port opening to the back surface of the main body.

In this arrangement, since the fluid discharged from the main body of the flow-velocity measuring device together, variations in ratio of the quantities of flow among the respective flow channels caused by the application of different back pressure to the respective flow channels due to the influence of the substances around the flow-velocity measuring device may be avoided. Therefore, the flow-velocity measuring device can measure the flow velocity of the measured fluid accurately.

As described thus far, the size in the direction of flow of the measured fluid is small because the flow-velocity measuring device of the invention is provided with the branches perpendicularly to the direction of flow of the measured fluid for separating the dust, and the surface area which blocks the flow of the measured fluid is small because the flow channels are overlapped. Therefore, the number of components is small, and the structure is simple.

DESCRIPTION OF THE PREFERRED EMBODIMENTS

Figure 1:
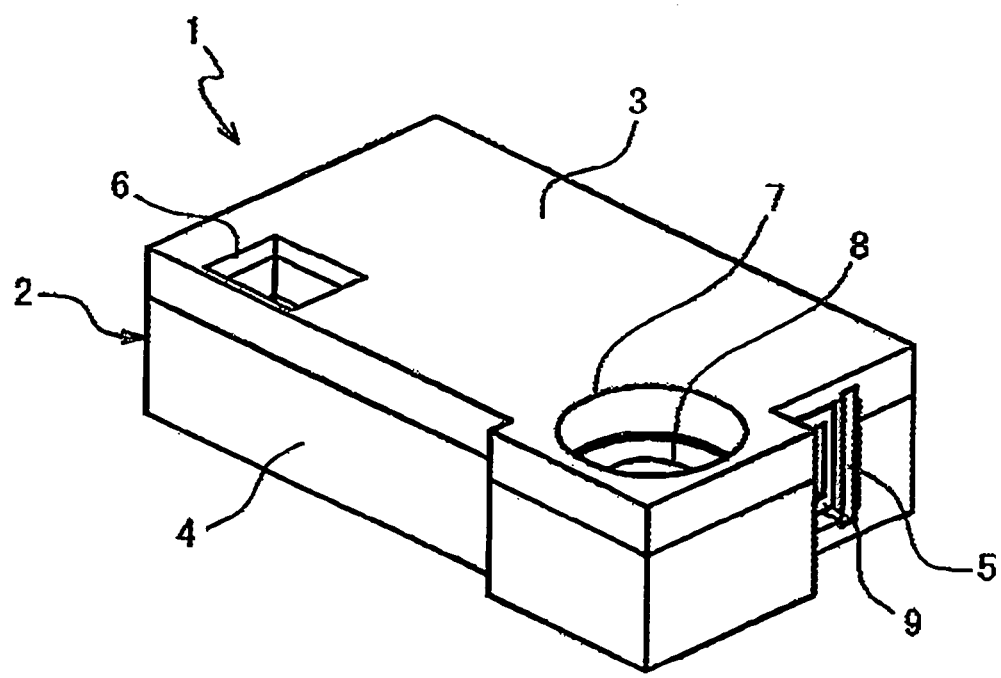
FIG. 1 is a perspective view of a flow-velocity measuring device according to the invention viewed from the front.

Referring now to the drawings, an embodiment of the invention will be described.

Figure 2:
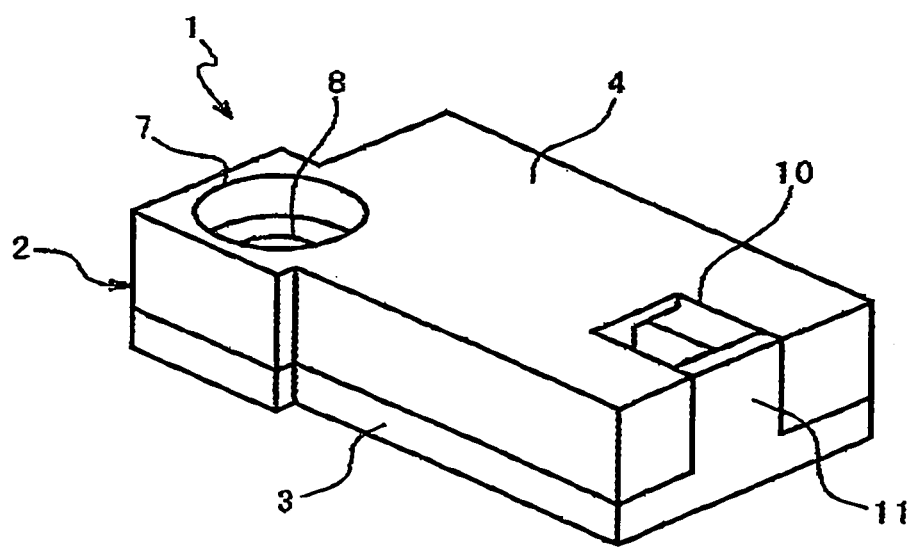
FIG. 2 is the perspective view of a flow-velocity measuring device in FIG. 1 viewed from the rear.

FIGS. 1 and 2 show a flow-velocity measuring device 1 according to a first embodiment of the invention placed with a front surface and a back surface thereof faced upward, respectively. In FIG. 1, the flow-velocity measuring device 1 is installed in a measured fluid flowing downward from above. The flow-velocity measuring device 1 includes a main body 2 of a substantially rectangular parallel piped shape. The main body 2 is divided into a front half member 3 on the upstream side of the measured fluid and a rear half member 4 on the downstream side, and a substrate 5 is clamped within the main body 2. An inlet port 6 opening on a front surface of the front half member 3 is provided at one end of the main body 2 of the flow-velocity measuring device 1 in the longitudinal direction, and a mounting hole 8 extending through the front half member 3 and the rear half member 4 and having spot facings 7 on both surfaces is provided at the other end of the main body 2. A connector 9 provided on the substrate 5 is exposed from the end surface on the side of the main body 2 of the flow-velocity measuring device 1 where the mounting hole 8 is provided. A discharge port 10 provided on the rear half member 4 is opened on the back surface at the end of the main body 2 on the side where the inlet port 5 is provided, and the discharge port 10 is sealed by a projecting wall portion 11 of the front half member 3 along a portion corresponding to the side surface of the main body 2.

Figure 3:
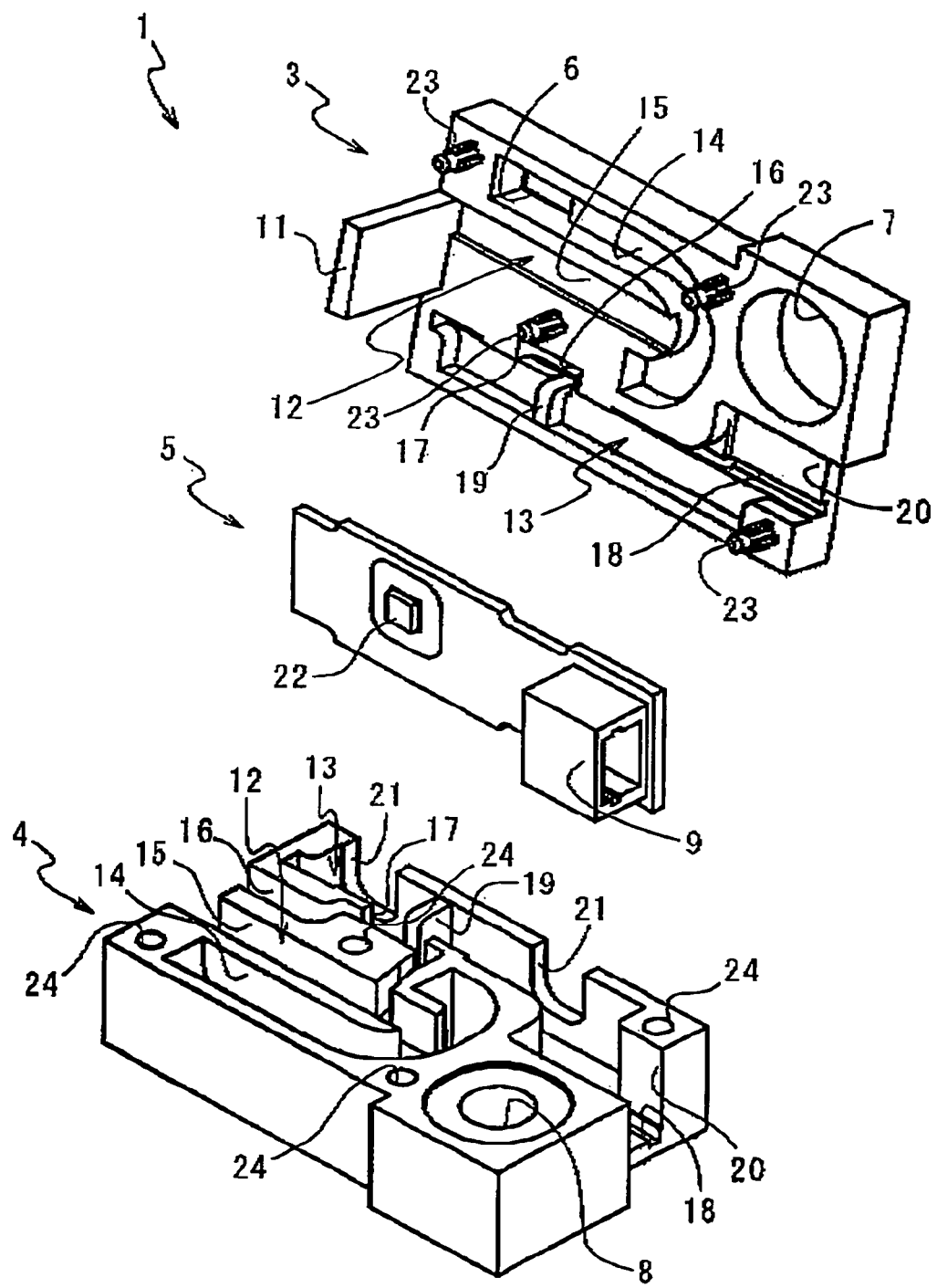
FIG. 3 is an exploded perspective view of the flow-velocity measuring device in FIG. 1.

FIG. 3 shows an exploded flow-velocity measuring device 1. As shown in the drawing, the front half member 3 and the rear half member 4 are formed with a flow channel 12 for allowing passage of the measured fluid and a storage section 13 for storing the substrate 5 defined by grooves provided on joint surfaces of both members. The flow channel 12 includes an introducing channel 14 extending linearly from the inlet port 6 on the joint surface (at a right angle with respect to a flowing direction of the measured fluid) and then being curved in an arcuate shape on the joint surface, a branch channel 15 being branched from the curved portion of the introducing channel 14 inwardly of the curve and extending in parallel with the linear portion of the introducing channel 14, a measuring channel 16 branched laterally from the branch channel 15, having a sensor opening 17 which is in communication with the storage section 13 in the middle thereof, and being defined at a terminal end so as to be aligned with the branch channel 15, and a lateral hole (discharge channel) 27, described later.

The storage section 13 is a groove located adjacently to the measuring channel 16 and extending in parallel with the introducing channel 14 and the branch channel 15. The storage section 13 is adapted to clamp the substrate 5 in an upright position with respect to the joint surfaces of the both half members 3, 4 with retaining grooves 18 which engage the end surfaces of the substrate 5, and includes an auxiliary wall 19 projecting from a wall on the side opposite from the sensor opening 17 for pressing the substrate against the sensor opening 17, a connector hole 20 opening on the end surface of the main body 2 for exposing a connector 9, and two trimmer holes 21 opening on the side surface of the main body 2 for operating the trimmer provided on the substrate 5. The substrate 5 is stored in the storage section 13 with the end surfaces on the longer sides faced toward the joint surfaces of the both half members 3, 4, that is, with the end surfaces faced in the direction of flow of the measured fluid.

A sensor element 22 provided on the substrate 5 is exposed in the measuring channel 16 through the sensor opening 17, and measures the velocity of the fluid in the measuring channel 16. The sensor element 22 is a known flow-velocity sensor including a heat generating member and a temperature measuring member. An output from the sensor element 22 is processed by a circuit provided on the substrate 5, and is sent to an external control device or the like via the connector 9.

The front half member 3 and the rear half member 4 are integrally joined by inserting a press-fit member 23 provided on the front half member 3 into an engaging hole 24 provided on the rear half member 4.

Figure 4:
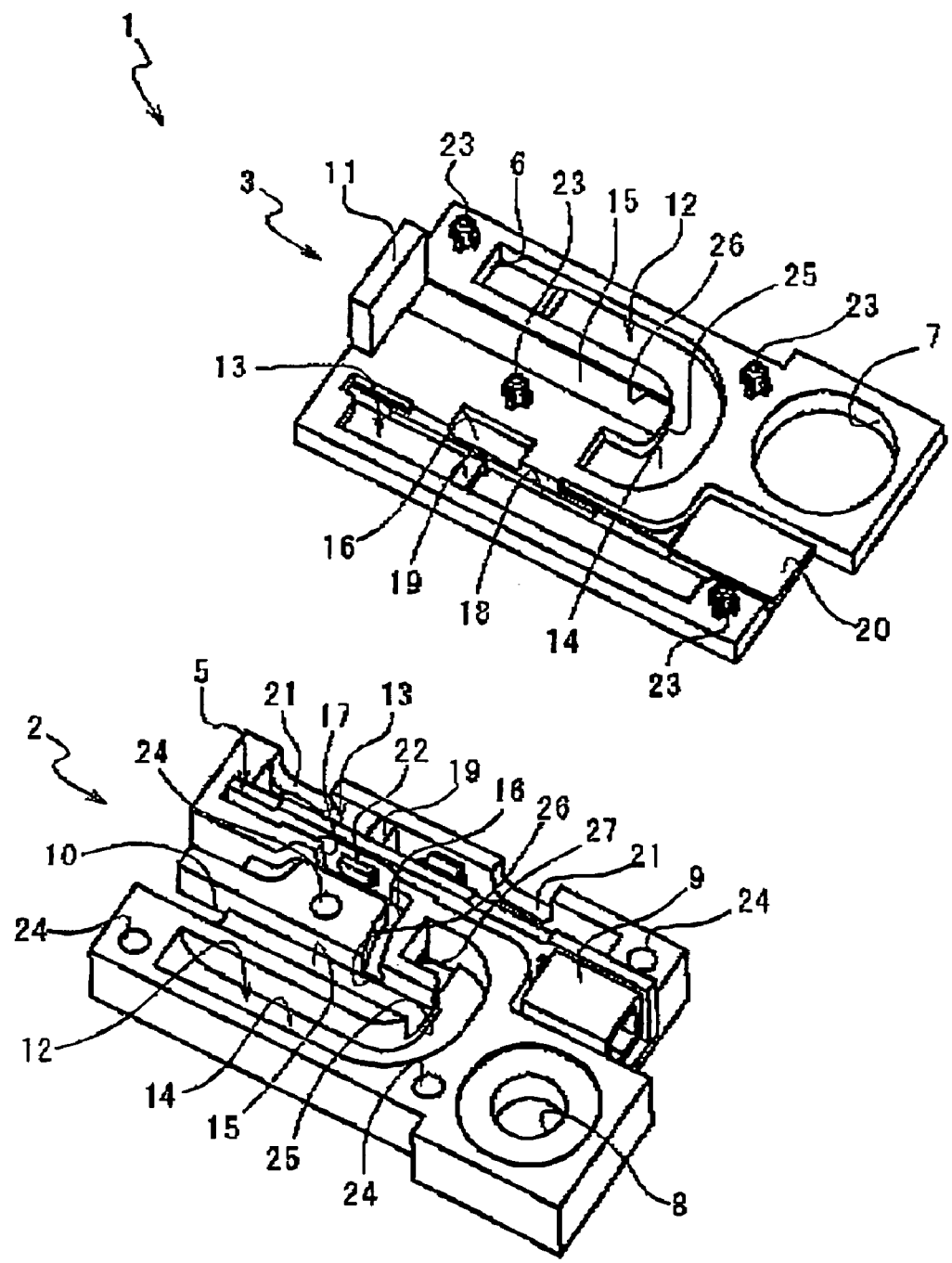
FIG. 4 is an exploded perspective view of the flow-velocity measuring device in FIG. 1 viewed from a different angle.

FIG. 4 is a drawing of the front half member 3 and the rear half member 4 with the substrate 5 stored therein viewed from a different angle. At a branch point from the introducing channel 14 to the branch channel 15 and a branch point from the branch channel 14 to the measuring channel 16, there are provided steps 25 and steps 26 on both of the front half member 3 and the rear half member 4 respectively, so that the depth decreases in sequence of the introducing channel 14, the branch channel 15, and the measuring channel 16. An end of the introducing channel 14 is further increased in depth of the groove and assumes a hole, which is in communication with a lateral hole 27 extending from the end surface of the rear half member 4 (side surface on the short side).

Figure 5:
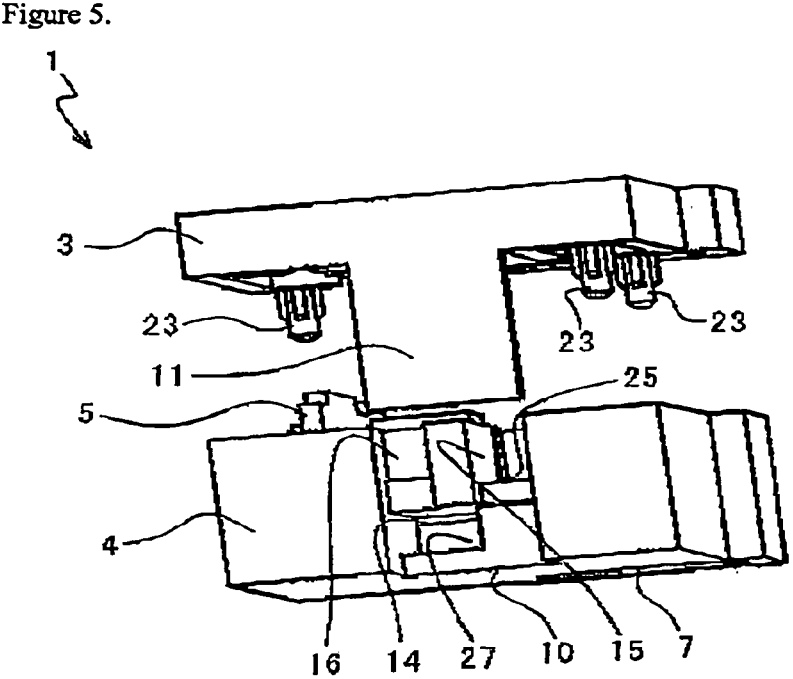
FIG. 5 is an exploded perspective view of the flow-velocity measuring device in FIG. 1 viewed from the direction of the end surface.

FIG. 5 shows the flow-velocity measuring device 1 viewed from the side of the end surface where the lateral hole 27 is opened. The lateral hole 27 extends linearly from the end surface of the rear half member 4 in parallel with the joint surface with respect to the front half member 3, and is in communication with the introducing flow channel 14 at the inner portion. The branch channel 15, the measuring channel 16, and the lateral hole 27 are in communication with the discharge port 10 opening on the end surface and the back surface of the rear half member 4, and a terminal end of the channel 12 opens toward the outside of the main body 2 via the discharge port 10. In other words, the introducing channel 14 opens toward the outside via the lateral hole. (discharge channel) 27 connected to the terminal end.

Figure 6:
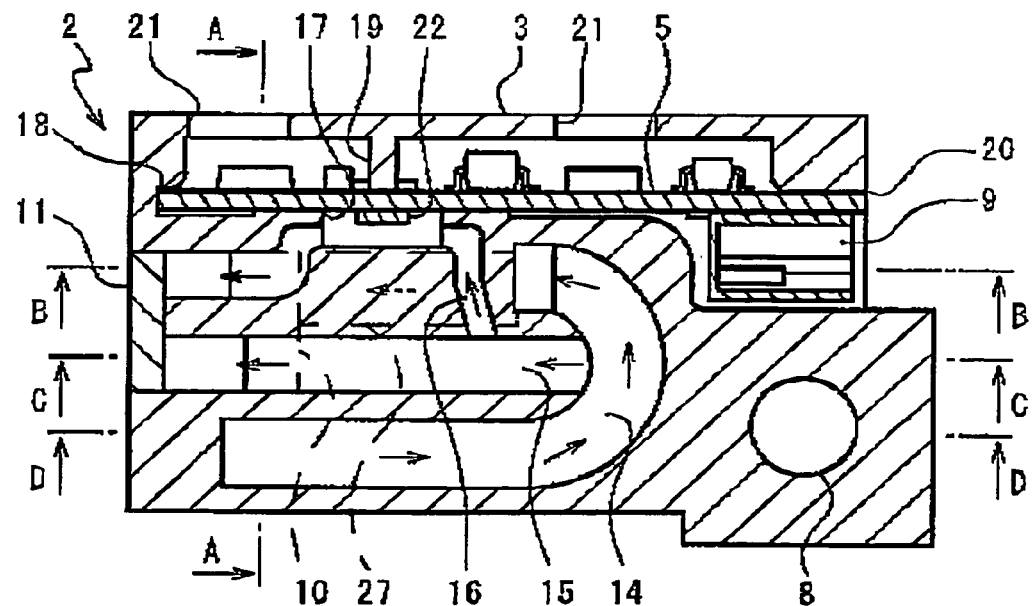
FIG. 6 is a cross-sectional view of the flow-velocity measuring device in FIG. 1.

FIG. 6 shows the flow-velocity measuring device 1 cut into two pieces so as to divide the thickness into equal parts. The lateral hole 27 is provided so as to extend in parallel with the branch channel 15 and overlap with the measuring channel 16, and the terminal end thereof is in communication with the measuring channel 16 and the branch channel 15 and opened on the back surface of the rear half member 4.

Figure 7:
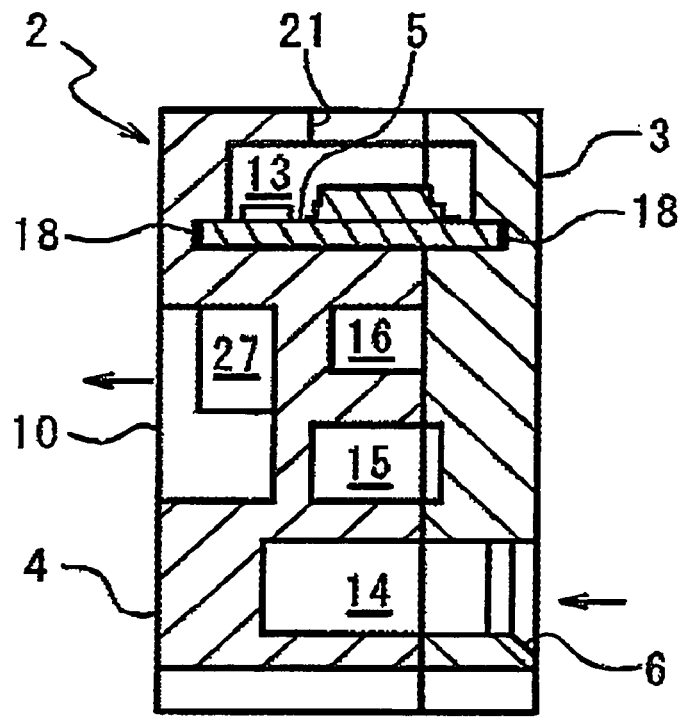
FIG. 7 is a cross-sectional view of the flow-velocity measuring device taken along a line A-A in FIG. 6.
Figure 8:
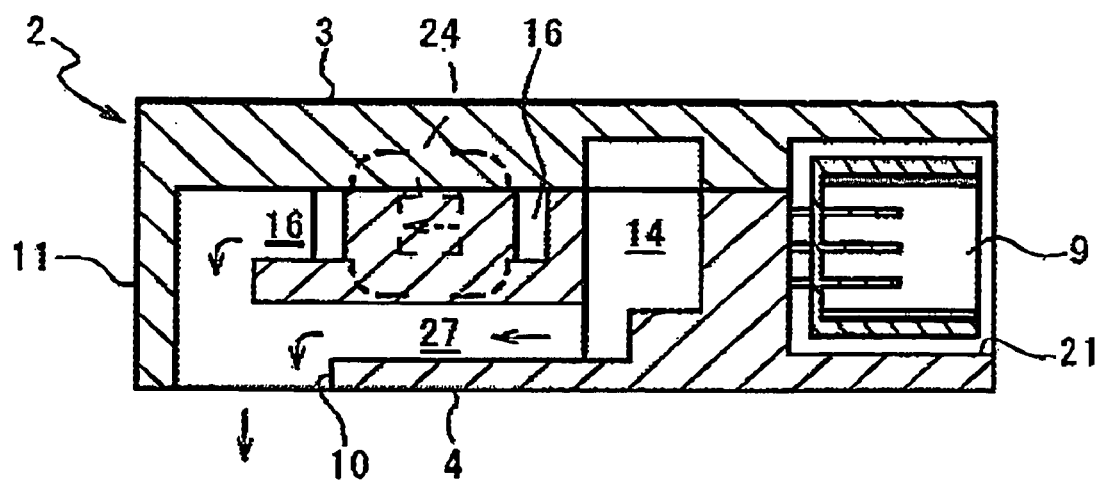
FIG. 8 is a cross-sectional view of the flow-velocity measuring device taken along the line B-B in FIG. 6.
Figure 9:
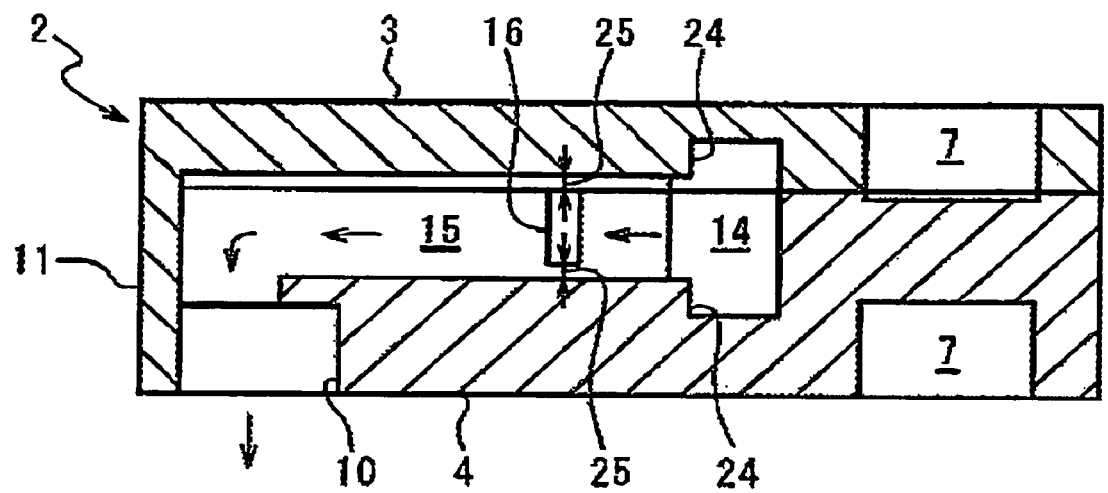
FIG. 9 is a cross-sectional view of the flow-velocity measuring device taken along the line C-C in FIG. 6.
Figure 10:
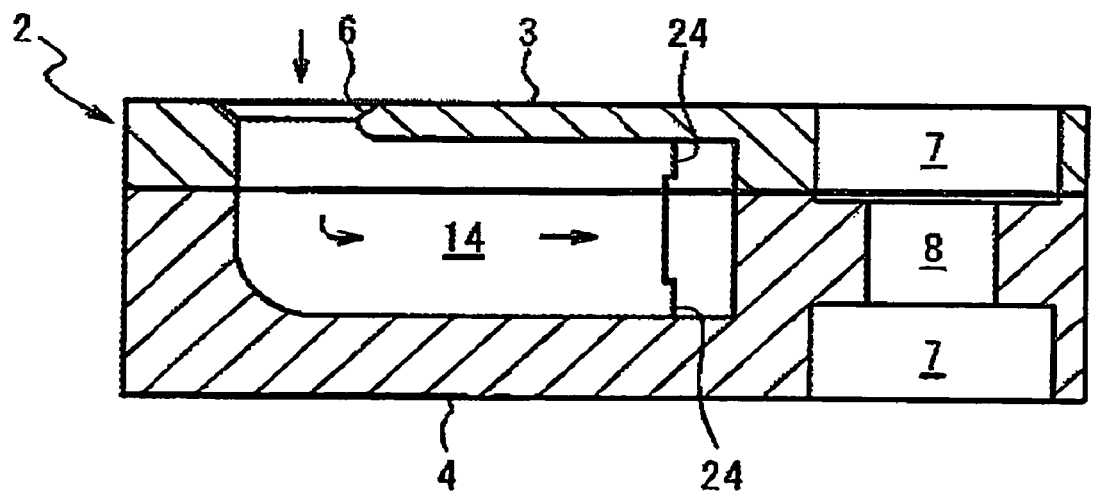
FIG. 10 is a cross-sectional view of the flow-velocity measuring device taken along the line D-D in FIG. 6.

FIG. 7 is a cross-sectional view of the flow-velocity measuring device 1 taken along the line indicated by arrows A and viewed in the arrow A direction in FIG. 6, FIG. 8 is a cross-sectional view taken along the line indicated by arrows B and viewed in the arrow B direction in FIG. 6, FIG. 9 is a cross-sectional view taken along the line indicated by arrows C and viewed in the arrow C direction and FIG. 10 is a cross-sectional view taken along the line indicated by arrows D and viewed in the arrow D direction. As shown in the drawings, the lateral hole 27 is partly overlapped with the measuring channel 16 in the direction of the thickness of the main body 2 (in the direction of flow of the measured fluid). As will be seen in the drawings, the depth of the groove in the direction of the thickness of the main body 2 is reduced in sequence of the introducing channel 14, the branch channel 15, and the measuring channel 16, and the step 25 is formed at a branch point from the introducing channel 14 to the branch channel 15, and the step 26 is formed at a branch point from the branch channel 15 to the measuring channel 16.

Subsequently, how the flow velocity of the measured fluid is measured in the flow-velocity measuring device 1 configured as described above will be described.

Figure 11:
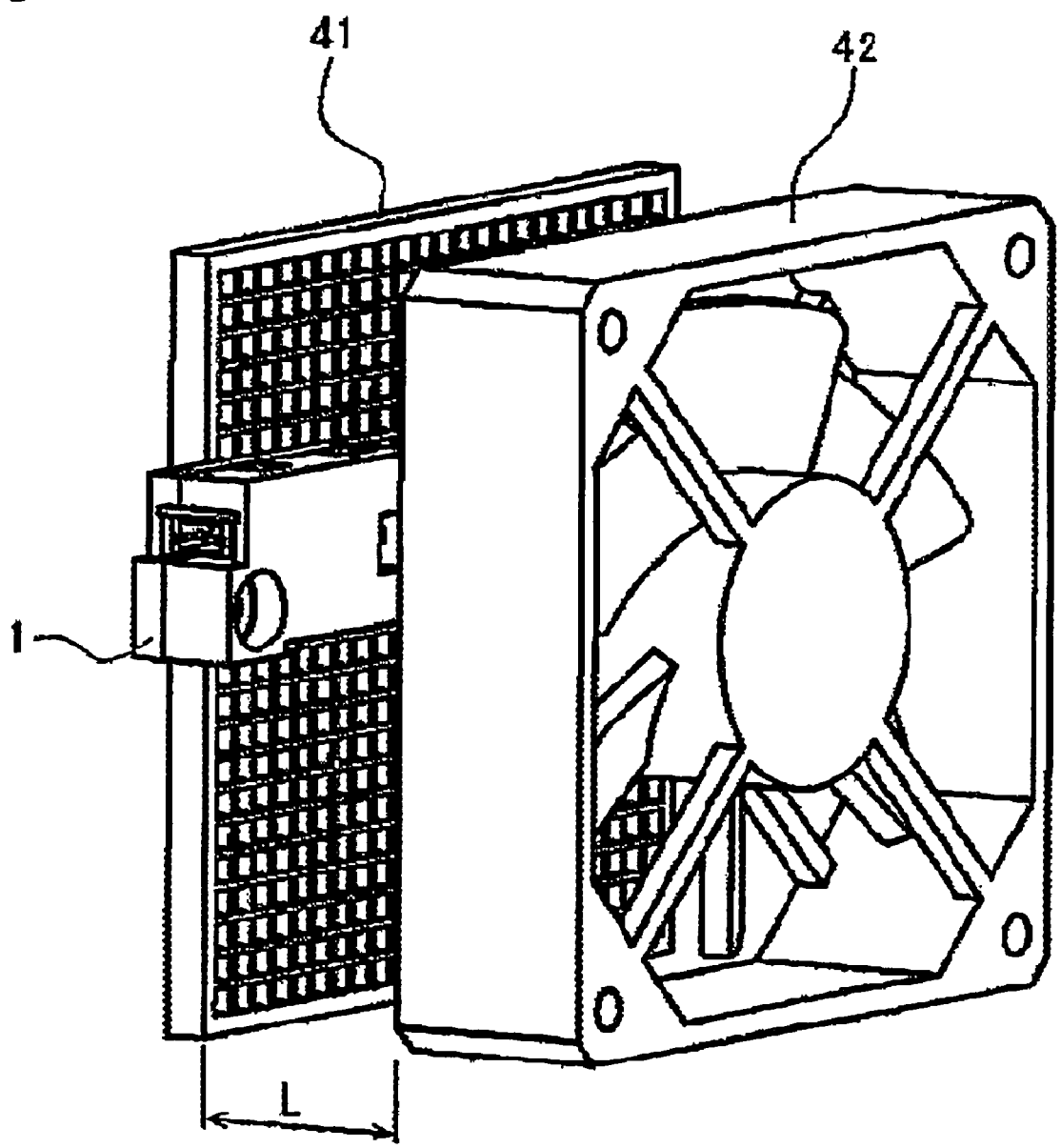
FIG. 11 is a perspective view showing an example of usage of the flow-velocity measuring device in FIG. 1.
Figure 12:
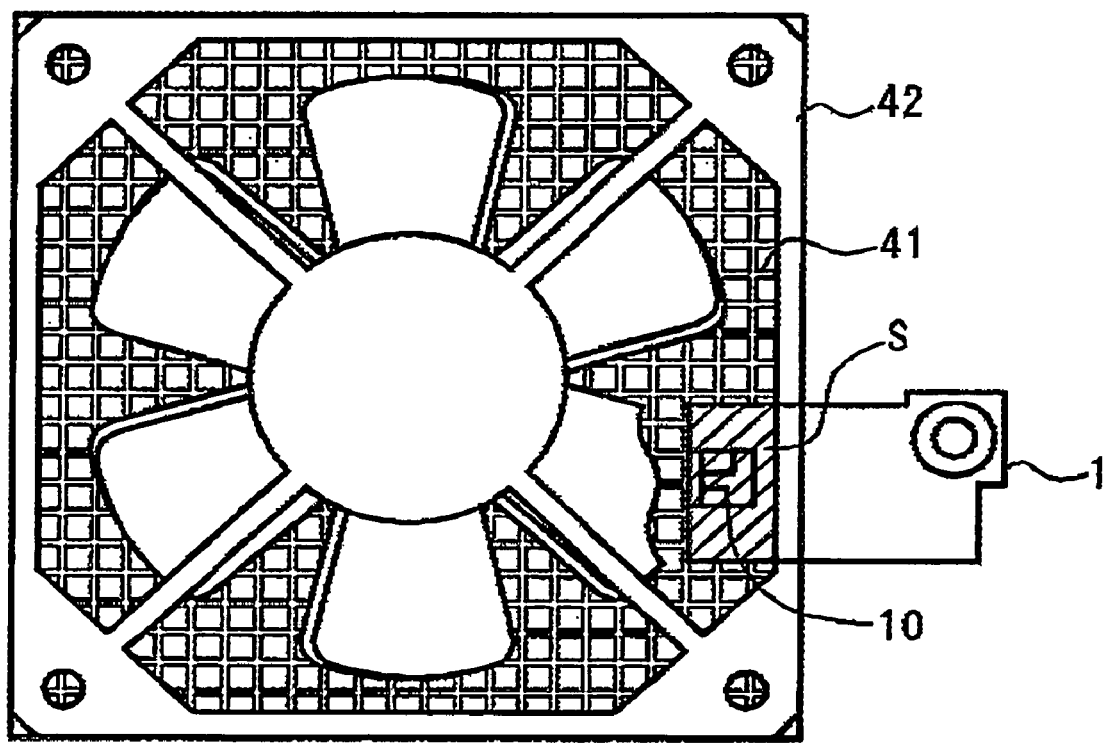
FIG. 12 is a back view of the example of usage in FIG. 11.

FIG. 11 shows an example of usage of the flow-velocity measuring device 1. The flow-velocity measuring device 1 is used for measuring the quantity of the airflow for cooling the interior of electric products, and is installed at the end of the airflow between a filter 41 at an air inlet port and an inlet fan 42 for sucking the outside air through the filter 41 with the inlet port 6 opposed to the filter 41, and with the discharge port 10 opposed to the inlet fan 42. Normally, the shorter the length L between the filter 41 and the cooling fan 42, the more it is preferable in terms of downsizing of the electric product. FIG. 12 shows the arrangement of the flow-velocity measuring device 1 viewed from the downstream side of the airflow. The flow-velocity measuring device 1 is fixed so that only the end portion where the discharge port 10 is provided projects into the airflow, and a surface area S of a hatched portion shown in the drawing is a surface area that substantially blocks the airflow.

The flow-velocity measuring device 1 installed as described above takes air through the inlet port 6 that opposes the flow of air as the measured fluid into the flow channel 12 therein, as shown by arrows in FIG. 10. The taken air flows along the introducing channel 14 extending in the direction at a right angle with respect to the flowing direction of the outside air. As shown in FIG. 6, the taken air flows along the curve at the rear half portion of the introducing channel 14, and part of the air is diverted to the branch channel 15 branched toward the center of the curve of the introducing channel 14, and remaining air passes through the lateral hole 27 and is discharged from the discharge port 10 to the outside of the main body 2. Since dust contained in the air in the curved portion of the introducing channel 14 is gathered on the outside of the curve by a centrifugal force generated by the own mass and the flow-velocity, the dust can hardly flow into the branch channel 15. In addition, since the branch channel 15 is branched laterally from the introducing channel 14, part of air flowing in the introducing channel 14 abruptly changes the flowing direction and flows into the branch channel 15. At this time, the dust contained in the air cannot change the direction abruptly due to its inertia exerted to its own mass, and hence it is separated from the airflow flowing into the branch channel 15, and passes over along the introducing channel 14. Part of the air flowing in the branch channel 15 is diverted to the measuring channel 16 branched laterally from the branch channel 15. In this case as well, the dust in the air tends to move straight ahead in the branch channel 15 by its inertia, a clean air having removed the dust is flowed into the measuring channel 16. The air flowed straight ahead in the branch channel 15 and the air diverted into the measuring channel 16 reaches the discharge port 10 respectively, and are discharged to the outside of the main body 2 together with the air passed through the lateral hole 27.

Since the sensor opening 18 is provided at the middle of the measuring channel 16 and hence the sensor element 22 is exposed toward the inside of the measuring channel 16, the velocity of the air flowed into the measuring channel 16 is measured by the sensor element 22. Since the velocity of the air in the measuring channel 16 has a relative relation with the velocity of the air outside the flow-velocity measuring device 1, the flow velocity of the air as the measured fluid is calculated from the velocity of the air measured by the sensor element 22. Although the measuring channel 16 is provided as a groove that communicates with the storage section 13 at the sensor opening 18, since the substrate 5 is strongly pressed against the sensor opening 18 by the auxiliary wall 19, the sensor opening 18 is sealed by the substrate 5, and air leakage from the measuring channel 16 to the storage section 13 is prevented. According to the invention, since the substrate 5 must only seal a small abutting surface of the sensor opening 18, the substrate 5 can be brought into tight contact with the abutting surface of the sensor opening 18 with the structure like the auxiliary wall 19, and hence a sealing member such as a packing is not necessary.

When the outside airflow is slow, the above-described inertia or the centrifugal force is small, and hence the dust in the air cannot be separated sufficiently. When the flow velocity of the air is low, the dust in the air settles downward by the gravitational force, and moves slowly on the lower side of the flow channel 12 along the airflow. However, when the flow-velocity measuring device 1 is mounted in the direction shown in FIG. 11, the branch channel 15 is positioned on the upper side of the introducing channel 14, the dust cannot be flowed into the branch channel 15. In the same manner, irrespective of the direction of installation of the flow-velocity measuring device 1, that is, even when it is installed from above, below, left or right, between the filter 41 and the cooling fan 42 in FIG. 11, when the flow velocity of the air is low, since there exists the upper and lower airflows in the flow channels 12, the dust is separated. When the direction of the airflow on the outside is vertical, the introducing channel 14, the branch channel 15 and the measuring channel 16 in the flow-velocity measuring device 1 are arranged side-by-side in the horizontal direction.

However, since there is provided the step 25 at the branch point from the introducing channel 14 to the branch channel 15 and the step 26 at the branch point from the branch channel 15 to the measuring channel 16. Therefore, the dust settled downward in the flow channel 12 cannot climb over the steps 25, 26, and gets left behind the airflow which is branched, thereby moving straight ahead in the introducing channel 14 or the branch channel 15. According to the invention, since the grooves are provided both on the front half member 3 and the rear half member 4 to define the flow channel 12, there exist the steps 25, 26 even though the flow-velocity measuring device 1 is mounted upside down, and hence the dust is prevented from being flowed into the measuring channel 16 and attaching on the sensor element 22.

The lateral hole 27 of the rear half member 4 of the flow-velocity measuring device 1 is provided linearly from the end surface of the rear half member 4 in parallel with the joint surface with respect to the front half member 3, and the discharge port 10, which corresponds to the opening of the lateral hole 27, the branch channel 15 and the measuring channel 16 on the side of the end surface of the main body 2 is sealed by the wall portion 11 provided on the front half member 3 so as to project therefrom. Therefore, the lateral hole 27, the branch channel 15, and the measuring channel 16 are opened only on the back surface of the rear half member 4. The rear half body 4 can be formed by injection molding using a three-part metal mold including two metal molds which are divided in the joint direction with respect to the front half member 3 where the lateral hole 27 is provided linearly from the end surface, and a metal mold which is separated in the direction of the end surface where the discharge port 10 is provided. Since utilization of such a three-part metal mold is a simple technique in the field of the injection molding, the price of the rear half member 4 does not increase. The flow-velocity measuring device 1 can advantageously be configured only with three parts; the rear half member 4, the front half member 3 which can be molded by the two-part metal mold, and the substrate 5 of normal structure, and hence the structure is simple and the manufacturing cost is low. Since the discharge port 10 is only opened on the back surface, the possibility that the airflow in the flow channel 12 is affected by the influence of peripheral substances, thereby causing the values of the flow velocity measured by the sensor elements 22 to be inaccurate is low.

According to the flow-velocity measuring device 1 of the invention, since the introducing channel 14, the branch channel 15, and the measuring channel 16 are arranged in line on the surface which extends perpendicularly to the direction of flow of the measured fluid, it can be installed even when the thickness in the direction of flow of the measured fluid is small and a length L between the filter 41 and the cooling fan 42 is short. Simultaneously, by arranging the lateral hole 27 so as to be overlapped with the thinnest measuring channel 16 in the direction of flow of the measured fluid, the surface area facing against the flow of the measured fluid is also reduced. In addition, since the inlet port 6 and the discharge port 10 are concentrated on the front and back surfaces at one end portion of the main body 2, the surface area S which is exposed to the airflow between the filter 41 and the cooling fan 42 and blocks the flow of the measured fluid is further reduced. Therefore, the flow-velocity measuring device 1 does not lower the efficiency of the cooling fan 42.

In the above-described flow-velocity measuring device 1, the discharge channel is defined by the lateral hole 27 provided on the rear half member 4. However, it is also possible to define the introducing channel by a lateral hole formed on the front half member and define the branch channel, the measuring channel, and the discharge channel by grooves provided on the joint surfaces of the both half members. Depending on the layout of the respective flow channels, the rear half portion of the branch channel or part of the measuring channel can be defined by a lateral hole.

The discharge port 10 for the respective flow channels is not necessarily required to be one port, and respective discharge ports may be opened on the outer surface of the main body 2. It is also possible to open the lateral hole as is to the side surface of the main body 2.

What is claimed is:

1. A flow-velocity measuring device comprising:
   an inlet port formed on a surface of a main body and opening toward the upstream of a measured fluid;
   an introducing channel extending in the main body from the inlet port;
   a branch channel branched from the introducing channel and connected at a terminal end thereof to a first discharge port opening on the surface of the main body;
   a discharge channel extending from the introducing channel and connected at a terminal end thereof to a second discharge port opening on the surface of the main body; and
   a sensor element provided in the branch channel or in a measuring channel further branched from the branch channel and connected at a terminal end thereof to a third discharge port opening on the surface of the main body,
   wherein at least any one of the discharge channel, the introducing channel, the branch channel, and the measuring channel comprises a part overlapped with other flow channels in the direction at a right angle with respect to the direction of flow of the introducing channel and the direction of flow of the branch channel at a branch point from the introducing channel to the branch channel.

2. The flow-velocity measuring device box according to claim 1, wherein the direction of the branch channel at a branch point from the introducing channel to the branch channel is a direction at a right angle to the direction opposing the inlet port.

3. The flow-velocity measuring device according to claim 2, wherein the main body comprises two half members to be joined to each other along the joint surfaces thereof, and the flow channel having the overlapped portion is a lateral hole which is in communication with the groove provided on the joint surface of the half member and extends from the opening on the side surface of the half member in parallel with the joint surface of the half member, and is not opened at least partly on the joint surfaces and is in communication with the grooves in the inner portion.

4. The flow-velocity measuring device according to claim 3, wherein the flow channels other than the flow channel having the overlapped portion are defined by the grooves formed on the joint surfaces of the half members.

5. The flow-velocity measuring device according to claim 3, wherein the lateral hole is opened also on the surface opposite from the joint surface at the opening on the side surface of the half member, and the opening on the side surface is sealed by a wall portion provided on the other half member.

6. The flow-velocity measuring device according to claim 3, wherein a storage section is defined by grooves further provided on the joint surfaces of the half members so as to be adjacent to the branch channel or the measuring channel and have a sensor opening that opens to the branch channel or the measuring channel, and the sensor element is provided on the substrate stored in the storage section with the end surfaces thereof faced to the joining direction of the half members so as to be exposed from the sensor opening toward the inside of the branch channel or the measuring channel.

7. The flow-velocity measuring device according to claim 1, wherein the main body comprises two half members to be joined to each other along the joint surfaces thereof, and the flow channel having the overlapped portion is a lateral hole which is in communication with the groove provided on the joint surface of the half member and extends from the opening on the side surface of the half member in parallel with the joint surface of the half member, and is not opened at least partly on the joint surfaces and is in communication with the grooves in the inner portion.

8. The flow-velocity measuring device according to claim 7, wherein the flow channels other than the flow channel having the overlapped portion are defined by the grooves formed on the joint surfaces of the half members.

9. The flow-velocity measuring device according to claim 8, wherein the lateral hole is opened also on the surface opposite from the joint surface at the opening on the side surface of the half member, and the opening on the side surface is sealed by a wall portion provided on the other half member.

10. The flow-velocity measuring device according to claim 8, wherein a storage section is defined by grooves further provided on the joint surfaces of the half members so as to be adjacent to the branch channel or the measuring channel and have a sensor opening that opens to the branch channel or the measuring channel, and the sensor element is provided on the substrate stored in the storage section with the end surfaces thereof faced to the joining direction of the half members so as to be exposed from the sensor opening toward the inside of the branch channel or the measuring channel.

11. The flow-velocity measuring device according to claim 7, wherein the lateral hole is opened also on the surface opposite from the joint surface at the opening on the side surface of the half member, and the opening on the side surface is sealed by a wall portion provided on the other half member.

12. The flow-velocity measuring device according to claim 11, wherein a storage section is defined by grooves further provided on the joint surfaces of the half members so as to be adjacent to the branch channel or the measuring channel and have a sensor opening that opens to the branch channel or the measuring channel, and the sensor element is provided on the substrate stored in the storage section with the end surfaces thereof faced to the joining direction of the half members so as to be exposed from the sensor opening toward the inside of the branch channel or the measuring channel.

13. The flow-velocity measuring device according to claim 7, wherein a storage section is defined by grooves further provided on the joint surfaces of the half members so as to be adjacent to the branch channel or the measuring channel and have a sensor opening that opens to the branch channel or the measuring channel, and the sensor element is provided on the substrate stored in the storage section with the end surfaces thereof faced to the joining direction of the half members so as to be exposed from the sensor opening toward the inside of the branch channel or the measuring channel.

14. The flow-velocity measuring device according to claim 13, wherein the groove provided on the joint surfaces of the half members are grooves whose depths from the both joint surfaces of the two half members change discontinuously.

15. The flow-velocity measuring device according to claim 1, wherein the flow channel having the overlapped portion is the discharge channel.

16. The flow-velocity measuring device according to claim 15, wherein the overlapped portion of the discharge channel is overlapped with the branch channel or the measuring channel where the sensor is provided.

17. The flow-velocity measuring device according to claim 1, wherein the sensor element is provided in the measuring channel.

18. The flow-velocity measuring device according to claim 1, wherein the inlet port, the first discharge port, the second discharge port and the third discharge port can all be opened near one end portion of the main body.

19. The flow-velocity measuring device according to claim 18, wherein the first discharge port, the second discharge port, and the third discharge port are formed of one discharge port opening to the back surface of the main body.

* * * * *